United States Patent [19]
Wolters et al.

[11] 4,036,258
[45] July 19, 1977

[54] HIGH SPEED SHUT OFF OF CONDUITS

[75] Inventors: Hans Richard Wolters, Schwalmtal; Heinz Keltjens, Hemmerden, both of Germany

[73] Assignee: Mannesmann Aktiengesellschaft, Dusseldorf, Germany

[21] Appl. No.: 646,951

[22] Filed: Jan. 7, 1976

[30] Foreign Application Priority Data

Jan. 8, 1975 Germany .................. 2500896

[51] Int. Cl.² ................................. F16L 37/28
[52] U.S. Cl. ........................ 137/614.04; 285/364; 285/406
[58] Field of Search .............. 137/614.04; 285/364, 285/365, 406, 407, 420, DIG. 21

[56] References Cited

U.S. PATENT DOCUMENTS

| 144,997 | 11/1873 | Mayall | 285/420 X |
| 404,786 | 6/1889 | Hanson | 137/614.04 |
| 1,093,868 | 4/1914 | Leighty | 285/420 X |
| 2,752,174 | 6/1956 | Frost | 285/420 X |

FOREIGN PATENT DOCUMENTS

| 1,149,069 | 5/1963 | Germany | 285/DIG. 21 |
| 538,523 | 1/1956 | Italy | 285/DIG. 21 |

Primary Examiner—Alan Cohan
Assistant Examiner—Gerald A. Michalsky
Attorney, Agent, or Firm—Ralf H. Siegemund

[57] ABSTRACT

Valve casings at the ends of two cryogenic conduits are held together by brackets which can be locked but are driven apart for fast separation. Valves in the casings close automatically when the conduits separate.

5 Claims, 4 Drawing Figures

HIGH SPEED SHUT OFF OF CONDUITS

BACKGROUND OF THE INVENTION

The present invention relates to a high speed shut off and disconnect device for interconnected conduits, particularly but not exclusive for cryogenic pipelines or conduits.

The transfer of very low temperature liquids through conduits poses significant problems. An example of such transfer is, for example, the pumping of a very low temperature liquid from a storage facility in a harbor to and into a tanker or vice versa. The need may (and will) arise that the connection between the vessel and the shore facility has to be separated and, possibly, quite fast at that. Equipment is known here to provide such separation by means of valves in a point of connection between two conduits, and further means are provided to separate the conduits physically, e.g. by hand or through a mechanical device. The known equipment requires some turning motion for obtaining the separation and that is inherently slow. Moreover, it must be expected that the connection is to some extent covered with ice, possibly even to such an extent that the ice positively interferes with rapid separation.

SUMMARY OF THE INVENTION

It is an object of the present invention to provide for rapid action separation and individual shut off of interconnected conduits to be particularly effective in the case of an emergency.

It is a specific object of the present invention to provide for reliable disconnection of interconnected cryogenic conduits without requiring manual intervention.

It is a still more specific object of the present invention to improve the connection between conduits whose respective ends are provided with radially extending collars which abut when the ends are juxtaposed. Moreover, each of the ends is to include individually valves to shut off each conduit separately, whereby neither the disconnect mechanism for the connector nor the valve operation is to require any externally applied turning motion about either conduit axis.

In accordance with the preferred embodiment of the invention it is suggested to provide a pair of check valves, one for each conduit end, which bias each other in an open position when the two conduit ends and collars abut. A pair of brackets holds the two collars together by operation of a locking means, but a hydraulic or pneumatic drive can retract the brackets and spread them apart preceded by operational unlocking. Following the retraction of the brackets both valves close as the conduits recede from each other. The locking means may comprise a tie rod with latch, whereby the drive unlatches the latch. Alternatively or additionally, springs in the drive bias the drive into a bracket-closing position to be overcome only by the hydraulic or pneumatic activation.

The brackets will be mounted on a pair of arms which may be constructed as levers each having one end pivoted on a common element to one side of the conduit or conduits while the other ends of the arms are interconnected by the drive, one such end being additionally provided with the latch, the other arm holding pivotally the tie rod. Alternatively, the arms each may extend to both sides from each bracket and the arms are separately interconnected by hydraulic drives respectively to one and the opposite side of a conduit or conduits. These arms may be guided additionally for parallel motion.

The brackets, arms, etc. are preferably affixed in some fashion to one of the conduits to remain attached after the conduits have separated. The drive or drives operate in a mode in which the respective piston rod is pushed out when disconnection is desired, which is an advantageous operation as any ice can readily be pushed out and away.

DESCRIPTION OF THE INVENTION

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
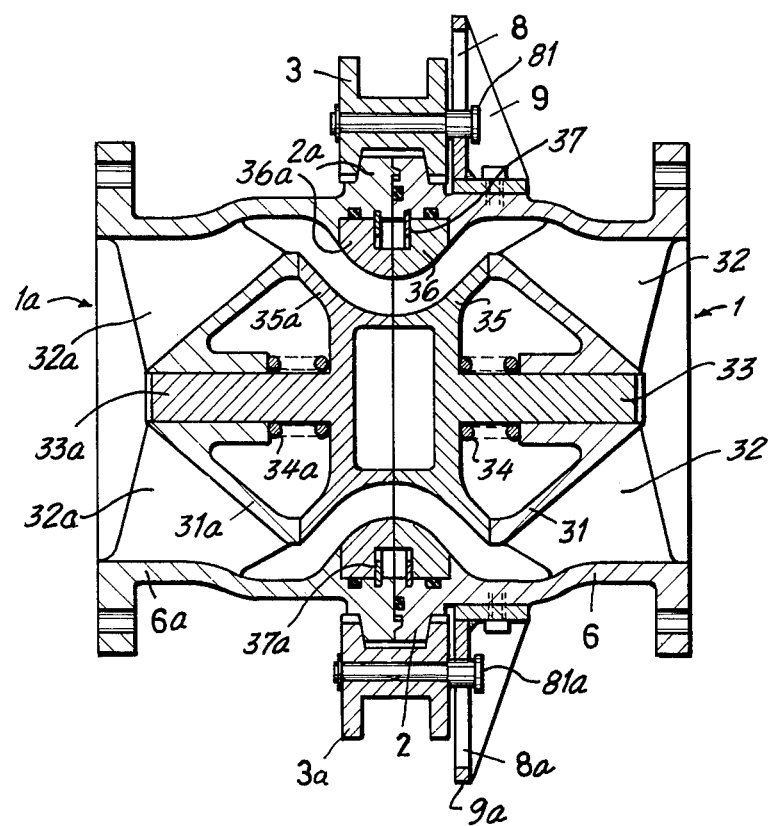
FIG. 1 is a longitudinal section through a connection between conduits improved in accordance with a first example of the preferred embodiment of the invention.

Proceeding now to the detailed description of the drawings, FIG. 1 shows two valve casings 6 and 6a respectively for connection to the ends of two pipelines or conduits proper and constituting, in effect, extensions of such conduits. The casings have flanges accordingly by means of which, for example, one casing is connected to the delivery or transfer equipment which may include a conduit being flexible at least in parts. The other casing may be connected to an outlet pipe or the like of a vessel.

Each of the valve casings has a collar or flange 2, 2a respectively which have front faces with interlocking structure as far as lateral (radial) relative displacement is concerned. Additionally, one of the front ends holds a sealing ring. The front ends of the casings actually constitute the front ends of the conduits, being thus provided for abutment in the position as shown. The two annular collars or flanges when together define an annular, radially extending collar with tapered sides.

Before proceeding to the description of the device that holds the two casings and conduits together, the valves shall be referred to briefly. The valves 1 and 1a are constructed as check valves, each having support body 31, 31a held respectively in the casing by spiders 32, 32a. The bodies are cone-shaped as facing the respective pipe interior and are traversed by axial bores. These bores receive guide pins 33, 33a for the movable valve element 35, 35a. These two elements are spring-biased by means of springs 34, 34a, and mutually engaging axial collars of the valve elements 35, 35a hold the valves in an open position when the valve casings abut and are held in front end abutment as illustrated in FIG. 1. The casings 6, 6a are provided with inserted annuli 36, 36a respectively serving as valve seats. The valve seats are held in position by snap rings 37, 37a.

It can thus be seen that both valves are closed by operation of the respective expanding spring when the casings and conduits are separated from each other. The elements 35, 35a have hollow interior to reduce the mass to be moved so as to speed up valve closing. The physical separation of the casings (following release by the clamping mechanism) may result e.g. in one of the conduits with casing just falling off.

Proceeding now to the description of the clamping mechanism, its basic elements are two clamp shoes constructed as brackets 3, 3a each having a circular groove with bevelled side walls for engagement with the bevelled or conical edges of collars 2 and 2a when juxtaposed. Assuming that the brackets or clamp shoes 3, 3a are being held in the locking position, any internal pressure in the conduit will cause the the collars 2, 2a to be more strongly urged into the clamp shoes which enhances the connection between the casing and impedes separation of the conduits, particularly, for example, if any axial force tends to drive the casings 6, 6a and conduits apart.

Each bracket has a pair of arms 7, 7' and 7a, 7a', respectively; the arms of each pair extend in opposite directions. Arms 7 and 7a are interconnected by a hydraulic or pneumatic drive 4, which includes a cylinder 41 and a piston with piston rod 42. Arms 7' and 7a' are analogously interconnected by a similar drive 4' on the other side of the conduits.

Figure 2:
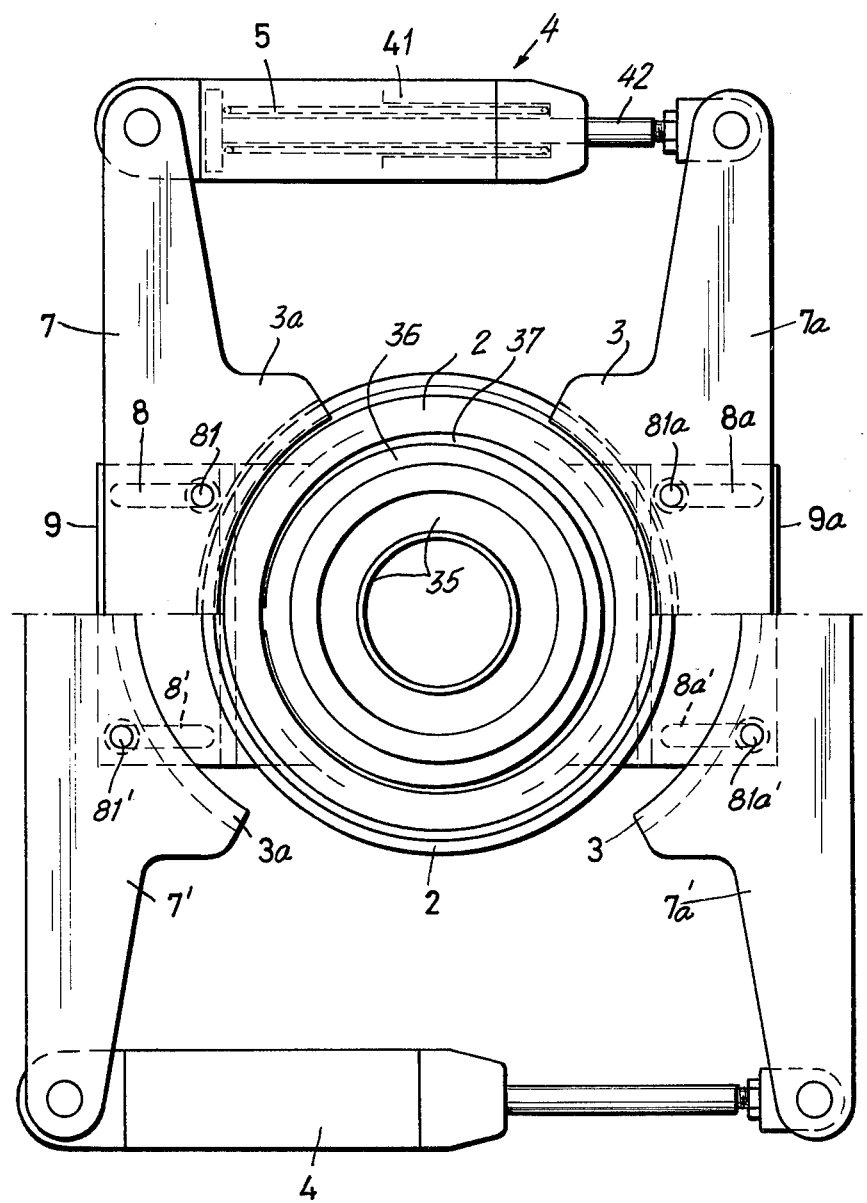
FIG. 2 is a front view of one of the conduits of FIG. 1 showing in its upper portion the upper portion of the connecting structure in closed, connecting and locked position, and in its lower portion the lower portion of the connecting structure in open, diconnecting and separating position.

The drives each contain a compression spring such as 5 in cylinder 41, which urges the piston for maximum possible retraction of the respective pistor rod, so that the clamp shoes or brackets are held and locked in clamping position, thereby fastening the casings 6, 6a together by positive engagement of and with the two collars 2, 2a. FIG. 1 and the upper portion of FIG. 2 show this disposition. It should be noted that the springs render the close-connection situation independent from any hydraulic or pneumatic pressure source to maintain the connection of the conduits closed and locked.

One of the casings, e.g. 6, is provided with a pair of brackets 9 and 9a being bolted thereto and having elongated slots 8, 8' and 8a, 8a' respectively extending parallel to the direction of desired bracket movement. These slots receive respectively guide pins 81, 81', 81a and 81a'. The slots 8 etc. all extend parallel to each other (or are even in line in pairs), so that the brackets and arms when spread apart by the drives move in opposition but along parallel paths and parallelly to the displacement of the respective pistons in the drives.

If, for any reason, the connection of the conduits (to which the valve casings 6, 6a are connected and of which they are parts) is to be opened and broken, both drives 4, 4' are activated and move the pistons against the spring forces, so that brackets 3 and 3a retract, thus separating the valve casings. The pneumatic or hydraulic pressure thus provides for the dual function of overcoming the spring forces thereby releasing the locks, and of driving physically the brackets apart. The springs 34, 34a may actively push the casings apart, and the two valves close. There may be some flexibility in one or the other or both of the conduits to permit that physical separation of the casings, so that the valves can be closed. Actually, one of the casings with conduit may immediately fall off by gravity. The clamping mechanism remains on one of the conduits e.g. on casing 6, which is preferably the one which stays in position even after the connection between the conduits is broken.

Figure 3:
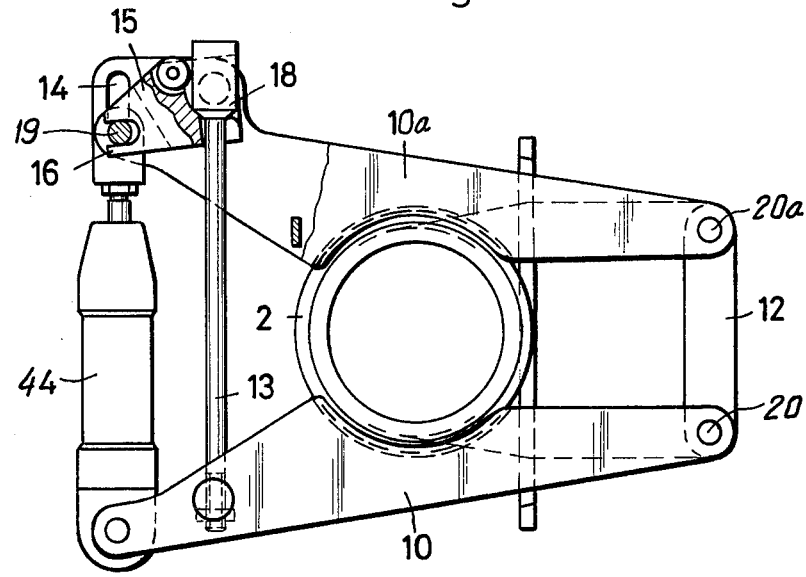
FIG. 3 is a front view of one conduit of a second example and in connecting and locked position.
Figure 4:
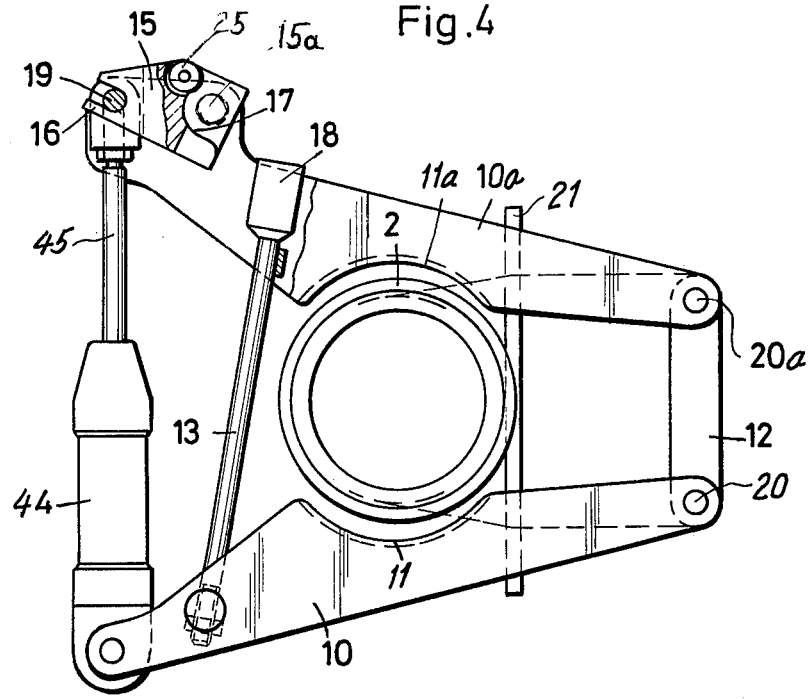
FIG. 4 is a front view of the same device of FIG. 3, but shown in open, pipe separating position.

Proceeding now to the description of FIGS. 3 and 4, the particular device includes two lever arms 10 and 10a portions of which are constructed as brackets or clamp shoes 11 and 11a analogous to brackets 3 and 3a of FIGS. 1 and 2. The valves are also similarly constructed. The arms have pivot points 20, 20a which are interconnected by a traverse 12. This traverse 12 has a length which is approximately equal to the diameter of the conduits valve casings.

The free ends of the levers or arms 10, 10a are interconnected by a hydraulic or pneumatic drive 44 with a cylinder and a piston rod 45. The cylinder of drive 44 is pivotably linked to arm 10; the end of arm 10 is of fork-like construction to hold the cylinder end of drive 44 in symmetric pivot support.

Piston rod 45 carries a pin 19 which runs in an elongated slot 14 of arm 10a, the end of the latter arm being of wider construction (in the plane of the drawing) than arm 10 to accommodate slot 14. The end of arm 10a is also of fork-like construction; one prong has actually been cut away in the view, and the slot 14 may only be provided in one fork prong end, e.g. the one still visible. However, both fork ends may have registering slots for a more balanced interaction between the arm 10a and the pin 19.

The slot (or slots) 14 is shorter than the stroke length of piston rod 45 and of the piston in the cylinder of drive 44. A dual purpose cam 15 is pivotably mounted on arm 10a (pivot pin 15a) and in the space between the fork or prong ends of arm 10a. The cam 15 has a fork 16 to establish a slot in which pin 19 can also slide, i.e. the fork 16 grips the portion of pin 19 which extends between the prongs of arm 10. The direction of movement of pin 19 is determined by the orientation of slot 14. However, the positioned movement of pin 19 in slot 14 determines the angular position and displacement of cam 15.

The second cam surface of cam 15, denoted 17, is provided to receive and to hold the head 18 of a tie rod 13. Thus, element 15 serves as a latch. The tie rod has its other end pivotably linked to arm 10 being located in the space between the prongs of that forked end or arm 10. The cam surface 17 and, actually element 15, has a groove to receive tie rod 13, while the calotta or ball-shaped lower surface of head 18 engages the cam surface 17. The element 15 has also a roll 25 which will kick head 18 for clockwise pivoting when element 15 is being pivoted clockwise (from the position shown in FIG. 3 to the position shown in FIG. 4).

FIG. 3 shows the device in closed position established by maximum retraction of the piston rod 45 by and of drive 44. Accordingly, pin 19 is in one end position in slot 14 and holds cam piece 15, through fork 16 in a latching position as far as cam surface 17 and head 18 is concerned. Actually, the particular inclination of element 15 as shown in FIG. 3 causes latching surface 17 to grip to some extent around head 18 holding it e.g. against vibration so that the latching condition is positively maintained. This way, tie rod 13 effectively locks the two arms 10, 10a in a position so that shoes or brackets 11, 11a hold the valve casings together just as brackets 3, 3a do as per FIG. 1.

If drive 44 is activated for protracting rod 45, pin 19 slides at first in slot or slots 14, i.e. the arms 10, 10a will not yet be spread apart, but cam piece 15 pivots clockwise, so that latch 17 releases head 18 and roll 25 kicks the head clockwise; the tie rod will abut at the rest stop as shown in FIG. 4. Further protraction of rod 45 causes pin 19 to abut the other end of slot 14 and thereafter arms 10 and 10a are spread apart. A slotted element 21 may serve as stop to limit the degree of angular spreading of arms 10, 10a. This element 21 may be affixed to one of the conduits or casings so that the entire clamping arrangement remains connected thereto.

It can readily be seen that in either example the drives push piston rods out for separating the holding arms for the brackets, so that any ice deposit will be broken away by that action; no turning is needed and the valves close automatically as soon as the conduits - valve casings have physically separated which is possible immediately upon retraction of the clamping brackets or shoes.

The invention is not limited to the embodiments described above, but all changes and modifications thereof not constituting departures from the spirit and scope of the invention are intended to be included.

We claim:

1. High speed shut off and separation device for two normally interconnected conduits, comprising:
   a pair of valves in the ends of the conduits including valve members biasing each other into open position when the conduit ends abut, but separating the conduit ends from each other and closing both conduits when the ends do not abut but are separated;
   collar means on each conduit end, the collar means together forming a single collar when the conduit ends abut concentrically;
   a pair of brackets having first and second operating positions, the brackets in the first position engaging the two collar means for holding the conduits together, the brackets when in the second position being disengaged from the collar means so that said valves close;
   a pair of arm means respectively on said brackets and carrying said brackets; and
   means including (a) at least one pneumatic or hydraulic drive for interconnecting one end each of said arm means with each other for moving the brackets from the first to the second position for shut-off and separation, further including (b) a tie rod pivoted on one of the arm means; (c) a latch on the other one of the arm means and cooperating with the tie rod for locking the arms and brackets in the first position; and (d) cam means on the latch operated in response to operation of said drive for unlatching the tie rod.

2. Device as in claim 1, said tie rod having a head engaging a cam surface in the latch, the latch having a groove for receiving the tie rod adjacent to the head in locking and latching position.

3. Device as in claim 2, said head having a ball-shaped surface for engagement with said cam surface.

4. Device as in claim 1, said latch pivoting on an axis which is in a similar plane as a pivot axis for the tie rod.

5. Device as in claim 1, said latch having a fork for engagement with and pivot operation by a pin, said latter pin connecting said drive to said other arm.

* * * * *